United States Patent
Dickerson et al.

(10) Patent No.: US 9,122,715 B2
(45) Date of Patent: Sep. 1, 2015

(54) DETECTING CHANGES IN END-USER TRANSACTION PERFORMANCE AND AVAILABILITY CAUSED BY CHANGES IN TRANSACTION SERVER CONFIGURATION

(75) Inventors: Scott Stephen Dickerson, Austin, TX (US); James Nicholas Klazynski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2749 days.

(21) Appl. No.: 11/427,365

(22) Filed: Jun. 29, 2006

(65) Prior Publication Data

US 2008/0065702 A1    Mar. 13, 2008

(51) Int. Cl.
    G06F 17/30           (2006.01)
(52) U.S. Cl.
    CPC ................. *G06F 17/30306* (2013.01)
(58) Field of Classification Search
    CPC .............................................. G06F 17/30306
    USPC ....................................................... 702/186
    See application file for complete search history.

(56) References Cited

U.S. PATENT DOCUMENTS

| | | | |
|---|---|---|---|
| 5,263,164 A | 11/1993 | Kannady et al. |
| 6,003,075 A | 12/1999 | Arendt et al. |
| 6,317,787 B1 | 11/2001 | Boyd et al. |
| 6,374,359 B1 | 4/2002 | Shrader et al. |
| 6,477,483 B1 | 11/2002 | Scarlat et al. |
| 6,549,944 B1 | 4/2003 | Weinberg et al. |
| 6,587,969 B1 | 7/2003 | Weinberg et al. |
| 6,631,411 B1 | 10/2003 | Welter et al. |
| 6,654,699 B2 | 11/2003 | Millard |
| 6,701,363 B1 | 3/2004 | Chiu et al. |
| 6,789,049 B2 | 9/2004 | Gross et al. |
| 7,481,361 B2 | 1/2009 | Dickerson et al. |
| 7,624,176 B2 | 11/2009 | Dickerson et al. |

(Continued)

FOREIGN PATENT DOCUMENTS

| | | |
|---|---|---|
| JP | 08320855 | 6/2006 |
| WO | 2004010293 A1 | 1/2004 |

OTHER PUBLICATIONS

"Technical Standard—Application Response Measurement (ARM) Issue 4.0—Java Binding," The Open Group, Oct. 2003, 94 pages.

(Continued)

*Primary Examiner* — Hosain Alam
*Assistant Examiner* — Navneet K Gmahl
(74) *Attorney, Agent, or Firm* — Yee & Associates, P.C.; Jeffrey S. LaBaw

(57) ABSTRACT

A method, apparatus, and computer program product for automatically detecting changes in end-user transaction performance and availability caused by a transaction server configuration change. When a configuration change to an element in a distributed computing system is proposed, a set of instrumented synthetic transactions in the distributed computer system is initiated. Access to managed resources by the synthetic transactions is tracked to produce a list of utilized resources for the transaction. The utilized resources are then categorized according to criteria including associating the utilized resources with respective transactions. The initiating, tracking, and categorizing steps are repeated after a proposed configuration change using a selected subset of the set of transactions. The effect of the proposed configuration change is then displayed for the selected subset of the set of transactions.

14 Claims, 9 Drawing Sheets

(56) References Cited

U.S. PATENT DOCUMENTS

| | | |
|---|---|---|
| 7,797,579 B2 | 9/2010 | Dickerson et al. |
| 2002/0040400 A1 | 4/2002 | Masters |
| 2002/0099521 A1* | 7/2002 | Yang et al. .................. 702/186 |
| 2002/0143933 A1 | 10/2002 | Hind et al. |
| 2003/0172145 A1* | 9/2003 | Nguyen ........................ 709/223 |
| 2004/0030703 A1 | 2/2004 | Bourbonnais et al. |
| 2004/0039728 A1 | 2/2004 | Fenlon et al. |
| 2004/0133882 A1 | 7/2004 | Angel et al. |
| 2004/0243520 A1 | 12/2004 | Bishop et al. |
| 2005/0096950 A1* | 5/2005 | Caplan et al. .................... 705/7 |
| 2006/0070033 A1 | 3/2006 | Care et al. |
| 2006/0085537 A1 | 4/2006 | Dickerson et al. |
| 2007/0006167 A1 | 1/2007 | Luk et al. |
| 2007/0069005 A1 | 3/2007 | Dickerson et al. |
| 2009/0095807 A1 | 4/2009 | Dickerson et al. |

OTHER PUBLICATIONS

Office Action, dated Feb. 14, 2008, regarding U.S. Appl. No. 10/965,214, 14 pages.

Final Office Action, dated Nov. 10, 2008, regarding U.S. Appl. No. 10/965,214, 20 pages.

Notice of Allowance, dated Jul. 13, 2009, regarding U.S. Appl. No. 10/965,214, 10 pages.

Notice of Allowance, dated Sep. 19, 2007, regarding U.S. Appl. No. 11/239,505, 7 pages.

Notice of Allowance, dated Apr. 30, 2010, regarding U.S. Appl. No. 12/342,046, 12 pages.

* cited by examiner

FIG. 5C 540

Number of Changes

| Property Name (542) | Old Value (544) | New Value (546) |
|---|---|---|
| User Name | Db2admin | New User |
| Concurrent Connection | 8 | 24 |

FIG. 5D 550

Report Table

| Date of Configuration Change (552) | Overall Status (554) | Administrator Responsible for Change (556) | Affected Transactions (558) |
|---|---|---|---|
| 06/16/2006 | Performance Problems detected | Scott Dickerson | 25 |
| 06/17/2006 | <!> Availability Problems detected | Scott Dickerson | 5 |
| 06/18/2006 | No issues detected | James Klazynski | 50 |

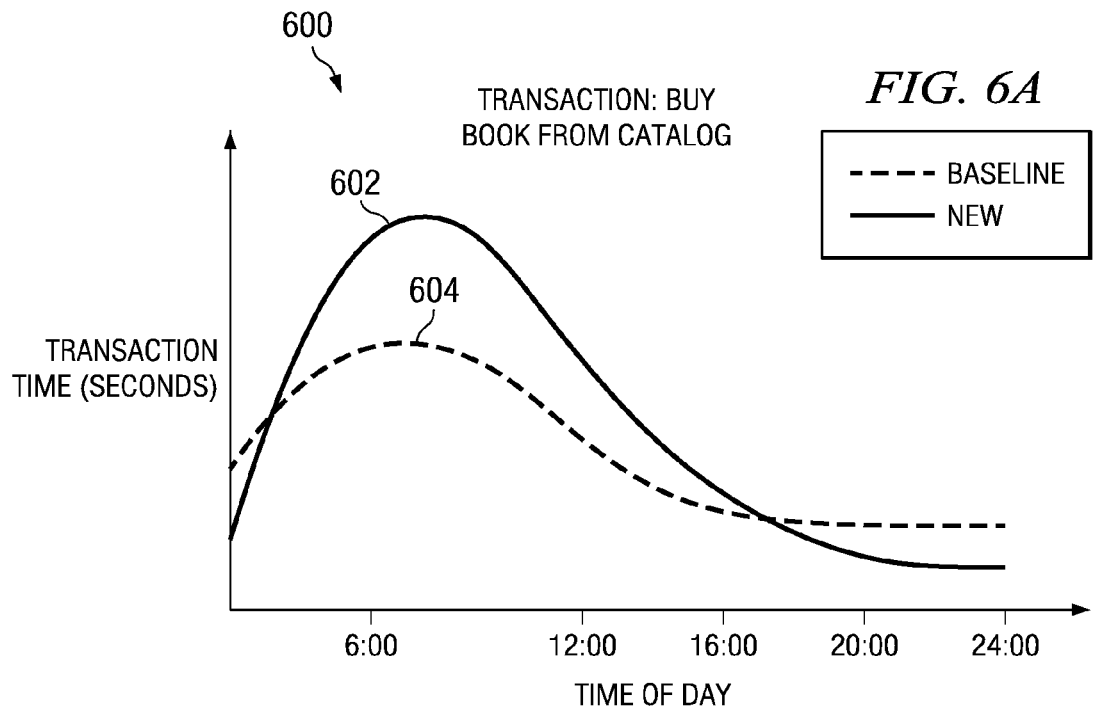

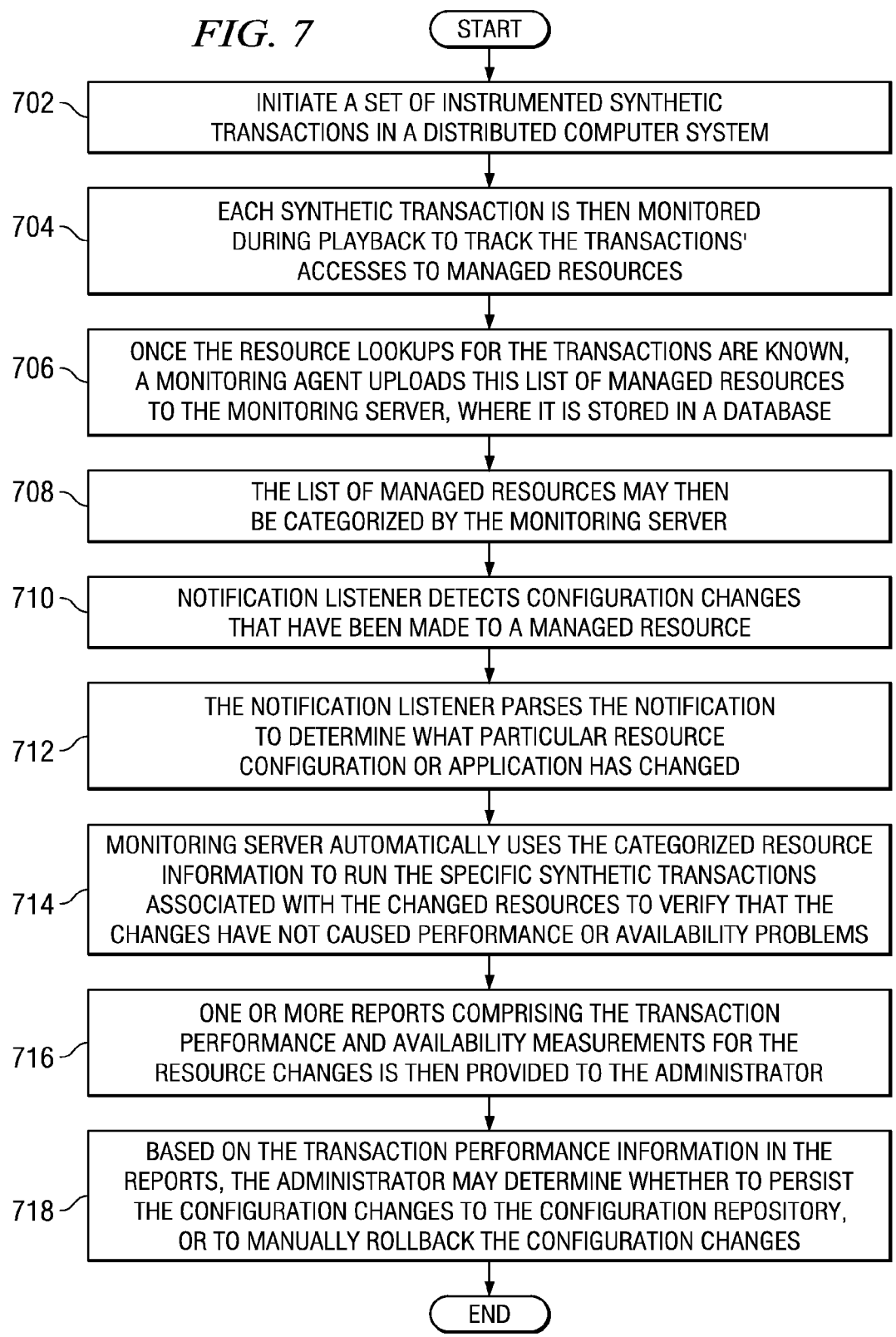

DETECTING CHANGES IN END-USER TRANSACTION PERFORMANCE AND AVAILABILITY CAUSED BY CHANGES IN TRANSACTION SERVER CONFIGURATION

BACKGROUND OF THE INVENTION

1. Field of the Invention

The present invention relates generally to an improved data processing system, and in particular, to a method for detecting changes in end-user transaction performance and availability caused by transaction server configuration changes.

2. Description of the Related Art

Performance monitoring is often used in optimizing the use of software in a system. A performance monitor is generally regarded as a facility incorporated into a processor to assist in analyzing selected characteristics of a system by determining the state of the machine at a particular point in time. One method of monitoring system performance is to monitor the system using a transactional-based view. The execution path of a transaction as it passes through an array of hosts, systems, application, Web and proxy servers, Web application servers, middleware, database management software, and legacy back-office software, may be monitored and performance characteristic data compiled and stored in a data repository for historical analysis and long-term planning. Sources of performance and availability problems may be isolated as they occur so that these problems can be corrected before they produce expensive outages and lost revenue.

One way in which this data may be compiled in order to test the performance of a system is to simulate customer transactions and collect performance data to help assess the health of electronic business components and configurations. Some performance monitors permit electronic business owners who need to ensure that their Web sites are available and meet performance targets to simulate customer transactions occurring on their Web sites by recording and playing back the transactions. A recording component captures performance data about actual user transactions that are executed against elements (e.g., Web servers or Web application servers) of the business environment. A playback component executes the recorded transactions to simulate actual user activity. These simulated transactions are known as synthetic transactions. Recording/playback of transactions allows a business owner to determine the manner by which transactions are processed by the various elements of the electronic business, and thus, which processes are causing problems and where the processes may be improved.

Change management, which is the process of developing a planned approach to change in an organization, is a critical piece of a customer's enterprise system. When a performance or availability problem with a critical e-business transaction is detected, a customer typically wants to know what changes have been made to the infrastructure that could be the source of the problem. As one example, if there is a problem in a Java 2 Platform Enterprise Edition (J2EE) transaction in a WebSphere Application Server (WAS), the system administrators are queried and asked to identify any configuration changes that have been made to WebSphere. Consequently, the particular configuration changes which may have negatively impacted the J2EE transaction may then be identified. Websphere applications, such as WAS, are available from International Business Machines Corporation. WAS is a J2EE application server that provides an operating environment for e-business applications that perform transactions over the Internet. Thus, as the configuration and applications deployed to WebSphere and other J2EE servers comprise a critical piece of a customer's infrastructure, it would be advantageous to minimize impacts caused by changes to WebSphere configurations.

Upon identifying configuration changes made to the system, however, there is currently no way to automatically isolate the specific transactions that are affected by a given configuration change. For example, if the configuration of a particular Java Message Service (JMS) server is changed in a customer's infrastructure, a system administrator has no way of determining which of the customer's transactions could be negatively impacted based on this change. In addition, these configuration changes are typically performed at night, when fewer transactions that rely on the resource are generated. For example, an administrator may enter the desired configuration changes into a maintenance window at 2:00 am. However, the administrator will not know if the configuration change has caused any performance or availability issues until a later time, such as when the end-users start to use the system again at 8:00 am in the morning.

Thus, the current art does not provide real-time results of the impact a configuration change will have on the end user's transactions. Furthermore, although some of the e-business applications may be identified and regression tested with the infrastructure changes, it is difficult to assess the full potential impact of the changes. As a result, changes to a customer's infrastructure may be under-tested before deployment.

SUMMARY OF THE INVENTION

The illustrative embodiments provide a method, apparatus, and computer program product for automatically detecting changes in end-user transaction performance and availability caused by a transaction server configuration change. When a configuration change to an element in a distributed computing system is proposed, a set of instrumented synthetic transactions in the distributed computer system is initiated. Access to managed resources by the synthetic transactions is tracked to produce a list of utilized resources for the transaction. The utilized resources are then categorized according to criteria including associating the utilized resources with respective transactions. The initiating, tracking, and categorizing steps are repeated after a proposed configuration change using a selected subset of the set of transactions. The effect of the proposed configuration change is then displayed for the selected subset of the set of transactions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5C is an exemplary table illustrating the configuration changes in accordance with the illustrative embodiments;

FIG. 5D is an exemplary report table in accordance with the illustrative embodiments;

FIG. 5E is an exemplary table illustrating details of the transactions impacted by the configuration changes in accordance with the illustrative embodiments;

FIG. 6A illustrates the impact a configuration change has on the performance of transactions over a certain period of time in accordance with the illustrative embodiments;

FIG. 7 is a flowchart of a process for automatically determining the impact of a transaction server configuration change on transaction performance and availability in real-time in accordance with the illustrative embodiments.

DETAILED DESCRIPTION OF THE PREFERRED EMBODIMENT

Figure 1:
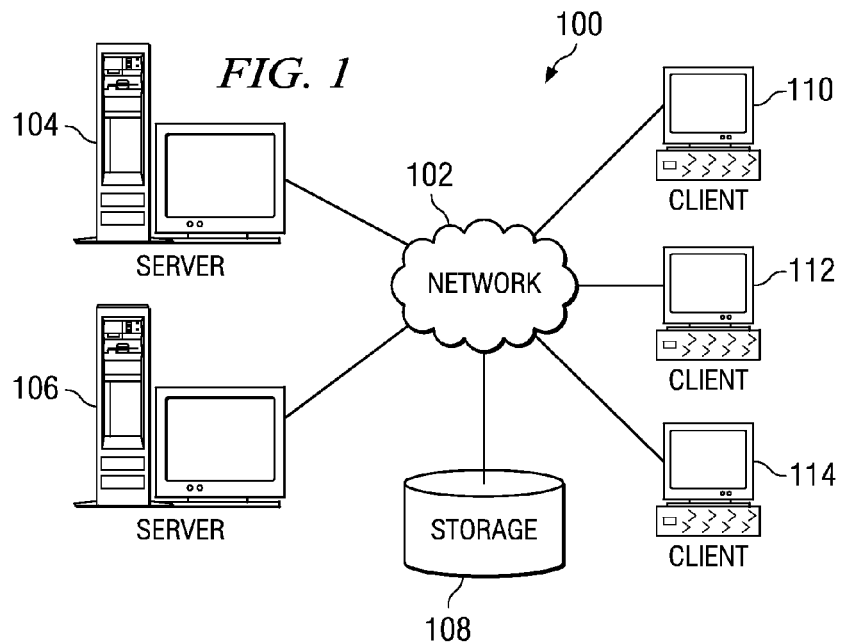
FIG. 1 depicts a pictorial representation of a distributed data processing system in which the illustrative embodiments may be implemented.
Figure 2:
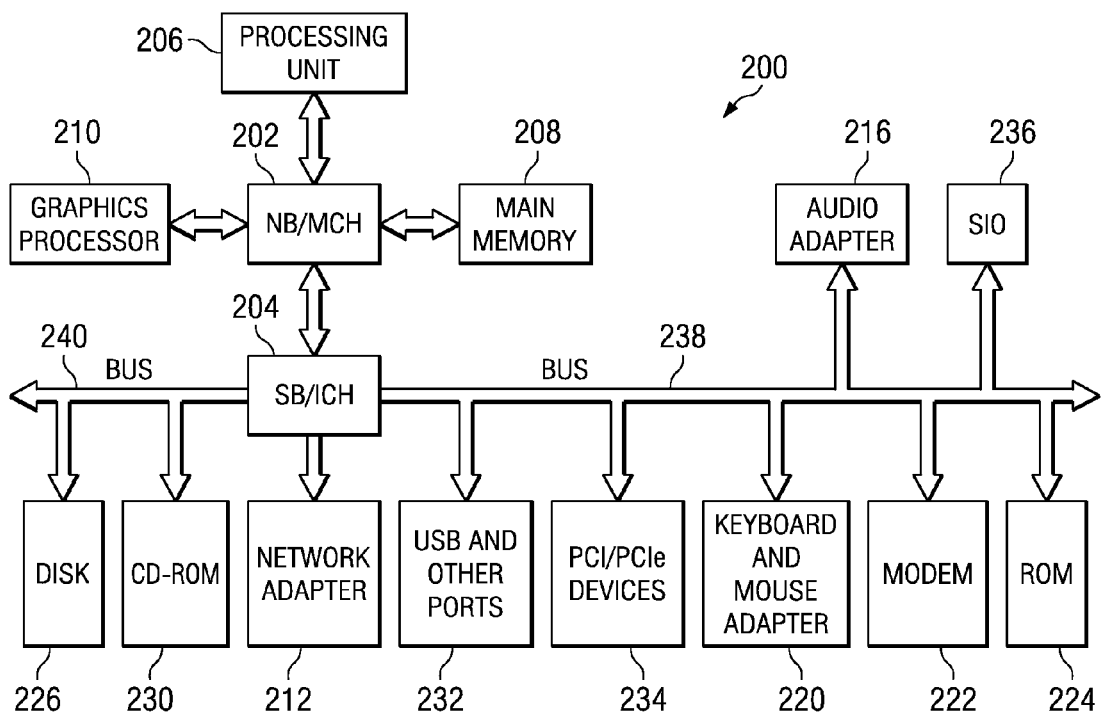
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

One or more servers, such as server 104, may provide Web services of an electronic business for access by client devices, such as clients 108, 110 and 112. A transaction performance monitoring system is provided for monitoring performance of components of the Web server and its enterprise back end systems in order to provide data representative of the enterprise business' performance in handling transactions. In one exemplary embodiment, this transaction performance monitoring system is IBM Tivoli Monitoring for Transaction Performance™ (TMTP) which measures and compiles transaction performance data including transaction processing times for various components within the enterprise system, error messages generated, and the like.

The illustrative embodiments provide an improved transaction performance monitoring system for detecting changes in end-user transaction performance and availability caused by transaction server configuration changes. The monitoring system discovers, in real-time, when a configuration change has been made to a customer's infrastructure, and then determines how these infrastructure changes may potentially impact end-user transaction performance and availability. A report is then provided to the system administrator which details the impact the particular changes will have on the end-user transactions. Thus, the monitoring system may immediately detect when an infrastructure change is made to the enterprise system, poll all of the transactions which may potentially be affected by the detected change, and report the effect of the change to the administrator in business terms. For example, the administrator may be notified that due to the change, an end-user cannot login to a Web site, add a book to the user's cart, etc.

The monitoring system may employ various transaction processing technologies for identifying transactions in an enterprise. In one example, dynamically inserted just-in-time-instrumentation (JITI) probes may be positioned at various entry points in the enterprise system to discover the transactions and identify the Uniform Resource Locators (URLs) specified in the end-user transactions. An end-user transaction is a transaction that a customer uses to accomplish a business goal. An exemplary method of using JITI probes to identify URLs in the transactions may be found in co-pending U.S. patent application Ser. No. 10/965,214, filed on Oct. 14, 2004. The JITI probes may monitor the recorded transactions and determine which applications and resources each transaction relies on to perform its function. The JITI probes track the resource lookup-type functionality specified in the transactions. In one example, the resource lookup-type functionality may be Java Naming and Directory Interface (JNDI), is an API for directory services which allows for the discovery and lookup of data and objects via a name. Thus, the monitoring system uses a resource lookup-type functionality to link each transaction to the resources it accesses. This transaction/resource link information is stored in a database and categorized according to transactional boundaries.

A notification listener is also employed in the monitoring system to immediately detect changes to a customer's infrastructure. The managed resources are monitorable items in that they use a publish/subscribe paradigm to announce configuration changes to their properties. Thus, by subscribing to these monitorable items, the notification listener may be notified when a configuration change occurs. In one example, each resource within the transaction server's configuration is a Java Management Extension (JMX) MBean. JMX is a Java technology that supplies tools for managing and monitoring applications, system objects, devices (e.g. printers) and service oriented networks. An MBean (managed bean) is a Java object that represents a manageable resource, such as an application, a service, a component, or a device. As MBeans have a publish/subscriber paradigm, the notification listener may subscribe to listen to particular MBeans. Consequently, if properties of one of the MBeans changes, the MBean fires an event to the subscribers of the MBean. Thus, the notification listener receives a notification from an MBean that a particular resource configuration change has occurred, and this notification provides the trigger that informs the monitoring system that the changes to the resource should be tested with regard to all of the transactions that may be affected by the change. The change to the resource and the potentially affected transactions are automatically tested by the monitoring system by running the recorded transactions to determine if the change has negatively affected the performance or availability of the transactions. This determination may be made by comparing each recorded transaction against a baseline transaction, such as a transaction recorded prior to the configuration change. A report may then be generated which illustrates the potential transaction outcomes of the configuration change on the transactions' performance and availability. The system administrator may use the report to decide whether to manually rollback the configuration change based on the performance and availability evaluation. Thus, with the monitoring system in the illustrative embodiments, a system administrator may be immediately informed of a configuration change in the transaction servers and the potential consequences the change will have on the transactions that use the changed resource.

The monitoring system described in the illustrative embodiments provide many advantages over existing systems, such as allowing a system administrator to obtain real-time results of a transaction server configuration change. The monitoring system may also provide a system administrator with scenarios of optimization to determine if transaction performance is better or worse because of the change. For example, when a particular configuration on a resource is set, the monitoring system may poll all of the recorded transactions which use the resource to immediately determine if transaction performance has been improved by the configuration change. If the performance has improved, the system administrator may keep the change. If performance did not improve, the system administrator may try another configuration to the resource.

Figure 3:
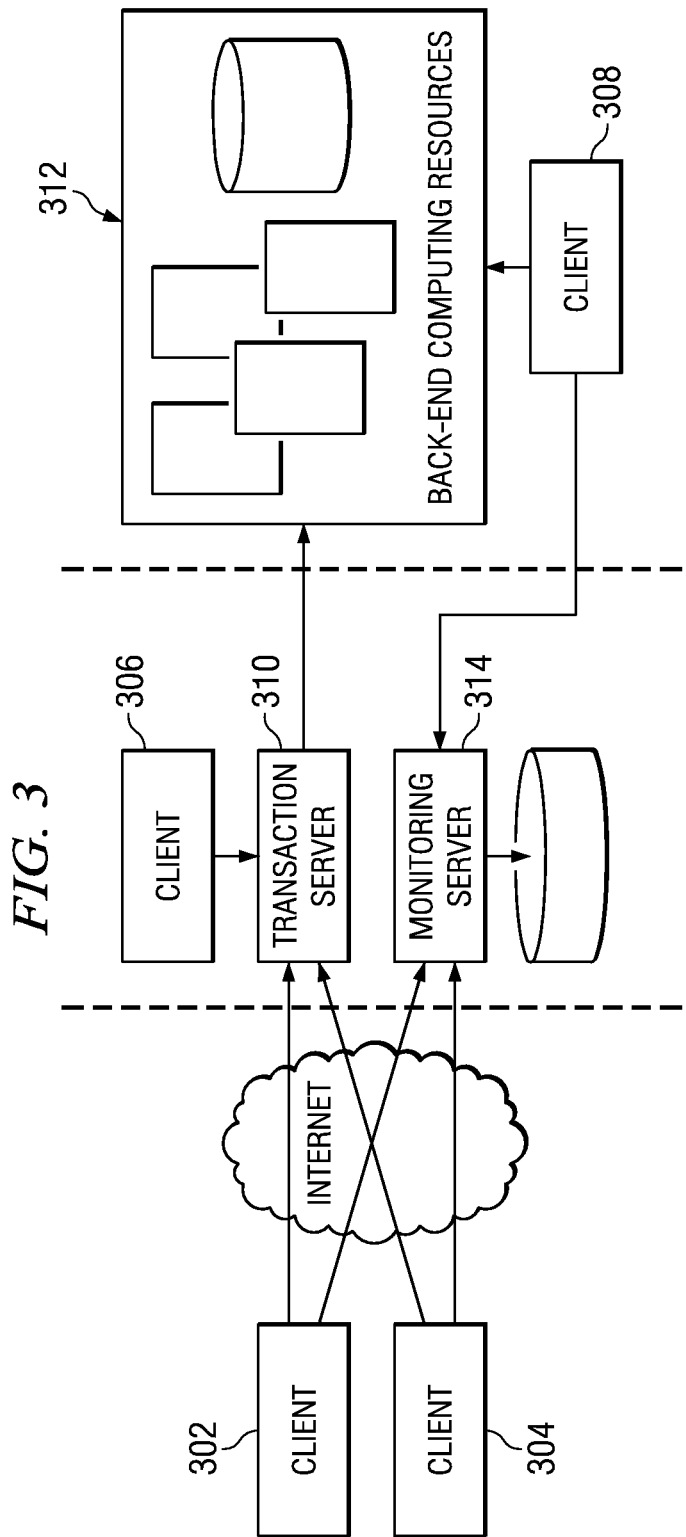
FIG. 3 is a conceptual diagram of an electronic business system transaction performance monitoring architecture in accordance with the illustrative embodiments.

Turning now to FIG. 3, an exemplary diagram of an electronic business system transaction performance monitoring architecture is shown in accordance with an illustrative embodiment of the present invention. Client devices 302-308 are examples of client devices such as clients 110-114 in FIG. 1. Transaction server 310 is an example of a server, such as servers 104 and 106 in FIG. 1. Client devices 302-308 may communicate with transaction server 310 in order to obtain access to services provided by the back-end enterprise computing system resources 312. Monitoring server 314 is provided for monitoring the processing of transactions by the transaction server 310 and back-end enterprise computing system resources 312.

Transaction server 310, back-end enterprise computing system resources 312 and monitoring server 314 are part of an enterprise system. Client devices 302-308 may submit requests to the enterprise system via transaction server 310, causing transactions to be created. The transactions are processed by transaction server 310 and back-end enterprise computing system resources 312 with monitoring server 314 monitoring the performance of transaction server 310 and back-end enterprise computing system resources 312 as they process the transactions. The components of transaction server 310 and back-end enterprise computing system resources 312 may include both hardware and software components. For example, the components may include host systems, JAVA Server Pages, servlets, entity beans, Enterprise Java Beans, data connections, and the like. Each component may have its own set of performance characteristics which may be collected and stored by monitoring server 314 in order to obtain an indication as to how the enterprise system is handling transactions. This performance monitoring involves collecting and storing data regarding performance parameters of the various components of transaction server 310 and back-end enterprise computing system resources 312. For example, monitoring of performance may involve collecting and storing information regarding the amount of time a particular component spends processing the transaction, a SQL query, component information including class name and instance ID in the Java Virtual Machine (JVM), memory usage statistics, any properties of the state of the JVM, properties of the components of the JVM, and/or properties of the system in general.

Figure 4:
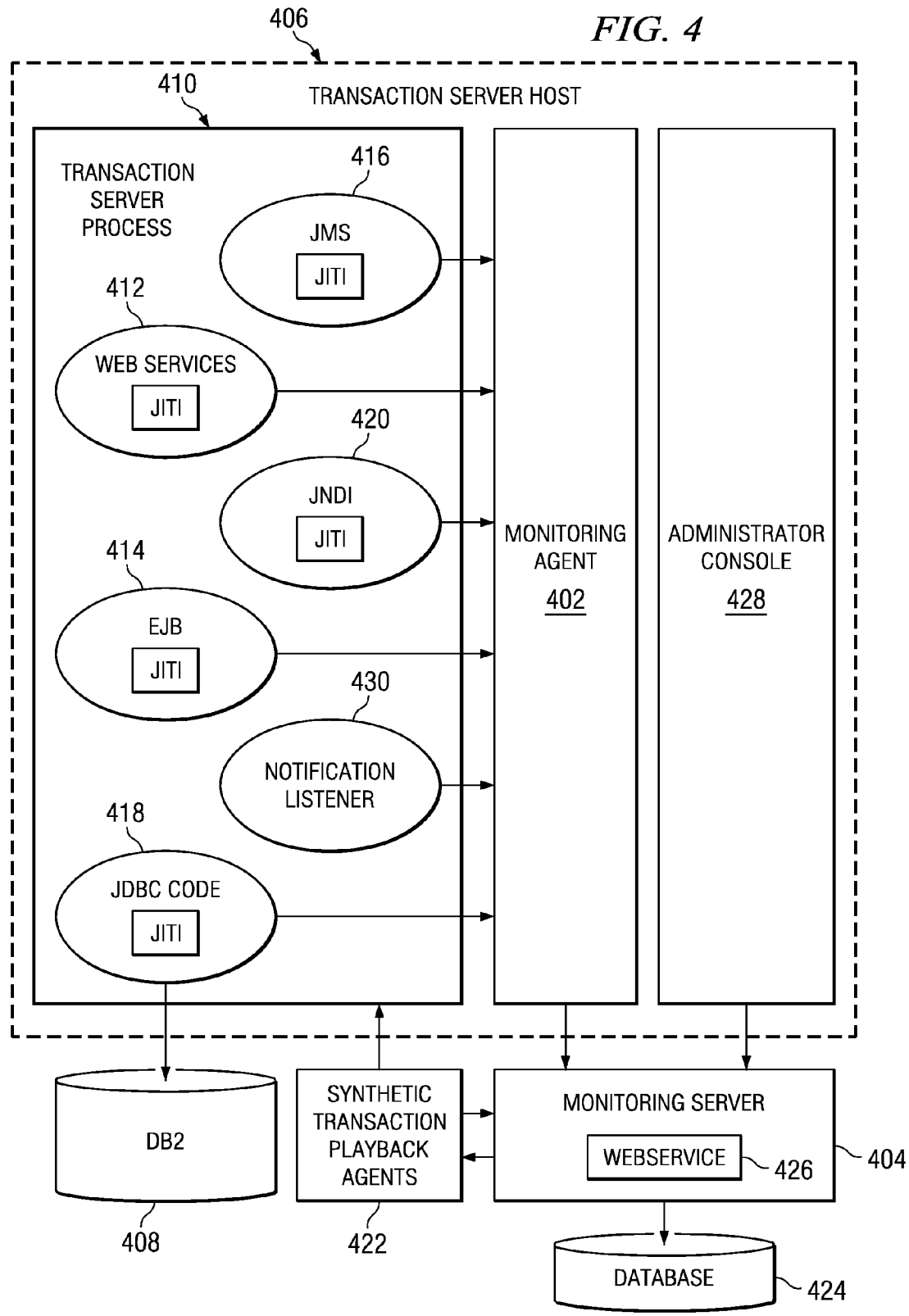
FIG. 4 is a block diagram of exemplary components used to automatically detect changes in transaction performance and availability caused by configuration changes.

FIG. 4 is an exemplary diagram of how JITI may be implemented within the enterprise system shown in FIG. 3 in accordance with an illustrative embodiment of the present invention. JITI may be implemented using any dynamic code insertion technology which allows for obtaining profiling data from the Java Virtual Machine by providing an interface between the Java Virtual Machine and an in-process JITI monitoring agent, such as monitoring agent 402. One example of such a dynamic code insertion technology is Java Virtual Machine Profiling Interface (JVMPI). As each class is loaded by the Java Virtual Machine, the Java Virtual Machine may send a JVMPI event. Monitoring agent 402 listens to these JVMPI events and dynamically inserts JITI code snippets into each of the user's Java classes using byte-code insertion. Monitoring server 404 is an example of a performance monitoring server, such as monitoring server 314 in FIG. 3. Transaction server host 406 is an example of a transaction server, such as transaction server 310 in FIG. 3. DB2 408 is an example back-end resource used by the transaction server.

JITI resides within transaction server process 410. In this illustrative example, JITI is shown to be implemented in Web Services 412, Enterprise Java Beans (EJB) 414, JMS 416, Java Database Connectivity (JDBC) 418 code, and Java Naming and Directory Interface (JNDI) 420 registry. JITI custom "instruments" the user's code to add JITI's own logic to the user's code, without requiring users to make any code changes on themselves. A JITI probe is a program that is inserted at a customizable entry point URL for the purpose of monitoring or collecting data about a business transaction. JITI tracks the Uniform Resource Locators (URLs) visited by customers and collects data related to system performance. When a call is made by one of these component codes, a JITI "probe" is inserted into the call. Thus, a JITI probe will be inserted into each DB2 call the user's code makes, each JMS call the user's codes makes, etc. A JITI monitoring agent, such as monitoring agent 402, passively listens to each call to determine the URL for the transaction as well as each sub-transaction associated with that URL. In other words, JITI is used to passively identify what URLs are involved in a transaction, and what sub-transactions (e.g., DB2, JMS, Web Service, Remote Method Invocation (RMI) calls) are initiated from those URLs. The monitored transaction data obtained by monitoring agent 402 may be uploaded to monitoring server 404.

Monitoring server 404 may also allow administrators to record and playback business transactions occurring on their Web sites. A recording component captures performance data about actual user transactions that are executed against elements (e.g., Web servers, Web application servers) of the business environment. A playback component executes the recorded transactions to simulate actual user activity. These simulated transactions, also known as synthetic transactions, are used to ensure performance and availability of critical e-business applications. For example, monitoring server 404 informs synthetic transaction engines playback agents 422 in the enterprise which recorded transactions are scheduled to be played back. Monitoring server 404 sends transaction playback schedules and transaction specifics to synthetic transaction playback agents 422. Synthetic transaction engine playback agents 422 pull these transactions from database 424 and play them back. Synthetic transaction playback agent 422 sends the results of the playback to monitoring server 404.

JITI probes in a resource lookup component, such as JNDI 420 registry, monitor each recorded synthetic transaction during playback to determine which resources within a J2EE application server the transactions utilize. JNDI 420 is an application programming interface (API) for directory services which allows for the discovery and lookup of data and objects via a name. The JITI probes track the lookups of the managed resources that each transaction relies on to perform its function. Monitoring agent 402 obtains the lookup information from the JITI probes and links each transaction to the managed resources the transaction utilizes. Monitoring agent 402 then uploads a list of the managed resources for each transaction to monitoring server 404, where the list is stored in a database, such as database 424.

The managed resource information is categorized by monitoring server 404. A separate thread within monitoring server 404 runs at a configurable interval to periodically categorize the resource information along transactional boundaries. This categorized resource information is also stored in database 424. WebService 426 is also provided within monitoring server 404 to allow administration console 428, hosted within transaction server host 406, to query database 424 via monitoring server 404. The categorized list in the database is queried when a managed resource or application is subsequently modified, and monitoring server 404 uses the categorized resource information to determine potential transactional outcomes and return the information to the system administrator via administration console 428. For instance, JITI probes may detect that the transaction identified by the URL "http://myhost/BuyBook", uses three JNDI resources, such as "jms/BookBuyQueue", "jdbc/BookInStockCatalog", and the "ejb/BuyBookBean". These three JNDI resources may then be associated in the monitoring server database with the "http://myhost/BuyBook" transaction and categorized. Another transaction, "http://myhost/Login only", may be detected as using the "jdbc/UserInfo resource". This transaction/resource association is also stored in the monitoring server database and categorized. Consequently, if the jdbc/BookInStockCatalog resource is updated, the potential impact report will list the "http://myhost/BuyBook" transaction but not the "http://myhost/Login" transaction.

Notification listener 430 is registered within transaction server process 410 to listen to resource configuration changes. As previously mentioned, one example of a monitorable resource item using a publish/subscribe paradigm to announce configuration changes to its properties is a Java Management Extension (JMX) MBean. A JMX MBean is a Java object that represents a manageable resource. Notification listener 430 subscribes to listen to specific MBeans. An MBean notification is sent to the notification listener 430 whenever the resource has been updated within the transaction server configuration. Notification listener 430 parses the MBean notification to determine which resource configuration has changed. This notification provides the trigger that informs the monitoring system that the changes to the resource should be tested with regard to all of the transactions that may be affected by the change. Although a MBean notification is used in this particular example, any other monitorable item having a publish/subscribe paradigm may be used to announce to the notification listener that a configuration change has occurred.

The resource configuration change and the potentially affected transactions are automatically tested by monitoring server 404 by using synthetic transaction playback agents 422 to run the recorded transactions. Potentially affected transactions are the transactions that utilize the changed resource. The potentially affected transactions are played back to determine if the resource change has negatively affected the performance or availability of the transactions. This determination may be made by comparing each recorded transaction against a baseline transaction. For example, a baseline may contain averages between the new transaction performance measurements after the configuration change was made (e.g., take 10 samples over 2 hours), or the baseline may contain minimum, maximum, or average values of the transaction's performance measured before the configuration changes were made. The monitoring system is aware of all previously recorded transactions, so any previously recorded transaction may be used as the baseline transaction.

The transactional outcomes of the configuration change on performance and availability may be presented to an administrator in a report within administration console 428. In this manner, a system administrator may be immediately informed of a configuration change and the potential consequences the change will have on the transactions that utilize the changed resource. The system administrator may use the information in the report to determine whether to manually rollback the configuration change based on the performance and availability evaluation.

The monitoring system in the illustrative embodiments may test the performance and availability of all of the transactions which are potentially affected by a detected configuration change. Thus, while existing methods may manually test only commonly used transactions before deployment after a resource change, the monitoring system in the illustrative embodiments provides more complete testing by rerunning all of the potentially affected transactions to verify that the change has not caused a performance of availability problem, regardless of how often a transaction is used.

Figure 5A:
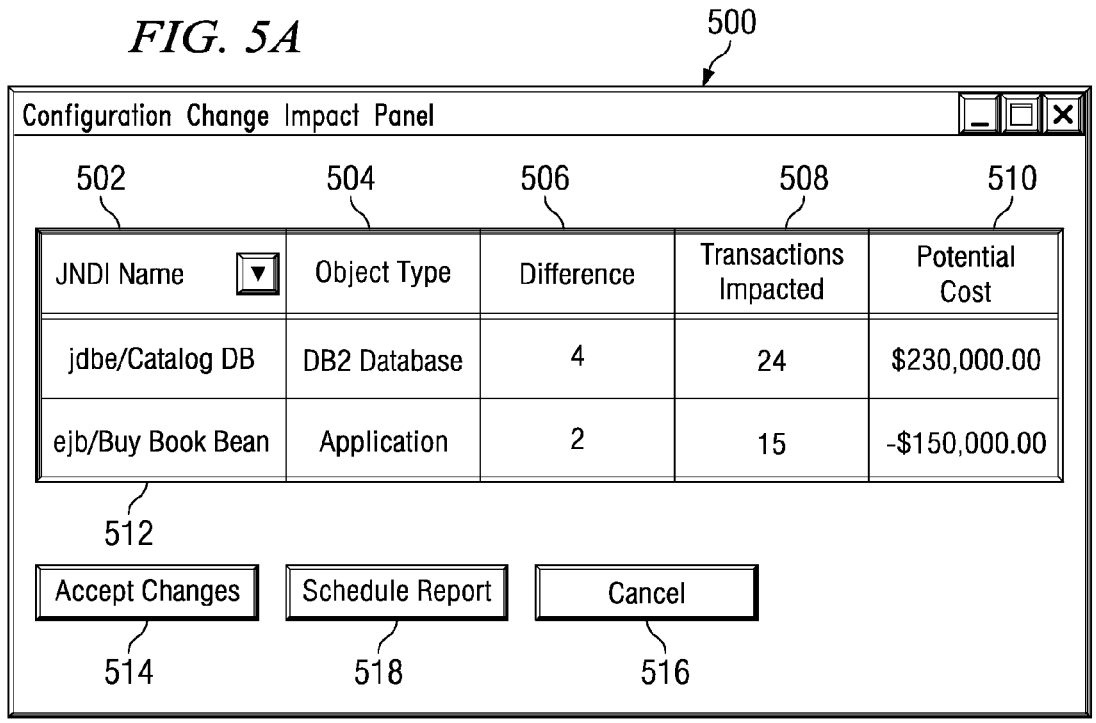
FIG. 5A is an exemplary panel provided to a user illustrating configuration changes made within a session in accordance with the illustrative embodiments.

FIG. 5A is an exemplary panel provided to a user illustrating configuration changes made within a session in accordance with the illustrative embodiments. Configuration change impact panel 500 is presented to an administrator via administration console 428 in FIG. 4 immediately after the administrator has made one or more configuration changes. The administrator may then view the information provided in configuration change impact panel 500 to determine whether or not to make the changes to the configuration repository permanent.

In this illustrative example, configuration change impact panel 500 comprises information regarding the specific resource that has been modified. Configuration change impact panel 500 includes various columns, such as JNDI name 502, object type 504, difference 506, transactions impacted 508, and potential cost 510. JNDI name 502 comprises the names of the resources referenced by the transaction, such as 'ejb/Buy Book Bean' 512. Object type 504 specifies the type of the resource. Difference 506 specifies the number of configuration changes that were made to the resource. Transactions impacted 508 specifies the number of transactions affected by the changes. Potential cost 510 may be calculated by adding up the dollar value of each of the transactions potentially affected by the change. Initially, the value of the average profit that the business receives for each transaction may be manually input by the administrator through the monitoring administration user interface. The average profit value of each transaction is then stored in a database and associated with the corresponding transaction. Based on the average number of transactions, a maximum potential cost is calculated and immediately displayed to the administrator in potential cost 510 column in configuration change impact panel 500. For instance, if a given transaction runs 100 times a day and the transactions earn an average of $2 per transaction, the maximum potential cost to the business of modifying a transaction server configuration item that would negatively impact the transactions would be $200 per day. Potential cost 510 column assumes a worst-case scenario, wherein the transaction is totally unavailable for the day based on the configuration change, and thus calculates all of the profit the business would lose in that worst-case scenario.

Based upon the information in configuration change impact panel 500, the administrator may persist the changes to the configuration repository by selecting 'accept changes' button 514. If the administrator does not want to keep the configuration changes, the administrator may select 'cancel' button 516. The administrator may also select 'schedule report' button 518 to schedule the affected transactions for playback over a certain time period. Although the synthetic transactions may be executed once or twice to obtain performance information, running the transactions over an extended time period allows one to more fully perceive what the outcomes of the configuration change will be. At a later point in time, the administrator may retrieve and view the transaction time comparison reports that were created for these affected transactions, as shown below in FIG. 5D.

Figure 5B:
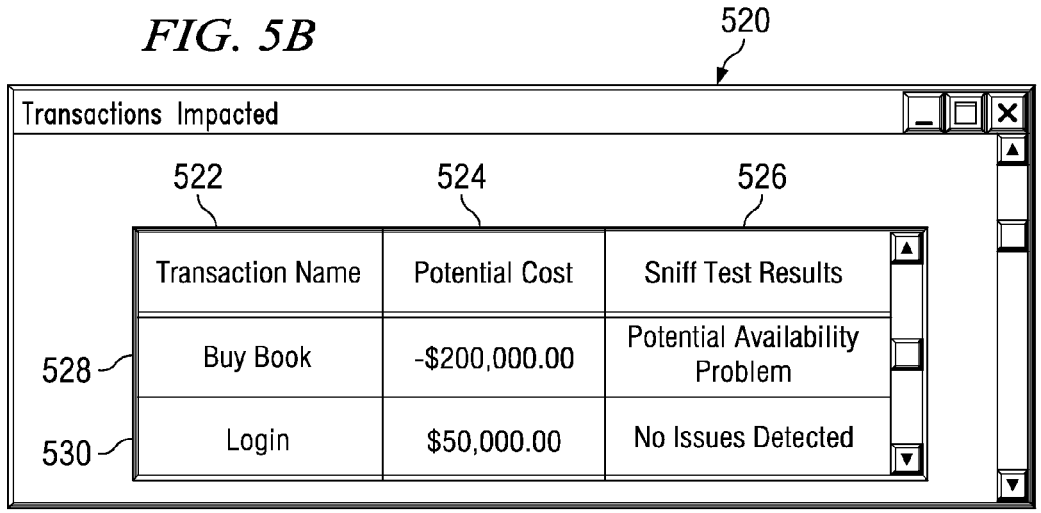
FIG. 5B is an exemplary table illustrating details of the transactions impacted by the configuration changes in accordance with the illustrative embodiments.

FIGS. 5B-5E illustrate additional tables of information that may be provided to the administrator from the table in FIG. 5A. In particular, FIG. 5B is an exemplary table illustrating details of the transactions impacted by the configuration changes in accordance with the illustrative embodiments. Transactions impacted table 520 in FIG. 5B may be presented to an administrator via administration console 428 in FIG. 4 when the administrator selects a value in transactions impacted 508 column in FIG. 5A.

In this illustrative example, transactions impacted table 520 comprises various columns, including transaction name 522, potential cost 524, and sniff test results 526. Transaction name 522 provides the names of the transactions, such as 'Buy Book' 528, which will be impacted by the configuration change. The potential cost that the change will have on the particular transaction is displayed in potential cost 524. The sum of the individual transaction cost values in potential cost 524 column should equal the total potential cost value for the resource in potential cost 510 column in FIG. 5A. Sniff test results 526 specify the outcome that the configuration change will have on the specific transaction. For instance, 'Buy Book' 528 transaction has a potential availability problem due to the change, while Login 530 transaction is unaffected by the change. Thus, when the desired configuration changes are applied temporarily to the transaction server instance, the affected transactions are quickly scheduled for playback with the changes, and outcome of the changes on the transactions are analyzed and provided to the user in the sniff test results 526 column in FIG. 5B. While a transaction is running, sniff test results 526 may display "pending" in table 520.

FIG. 5C is an exemplary table illustrating the configuration changes in accordance with the illustrative embodiments. Number of changes table 540 in FIG. 5C may be presented to an administrator via administration console 428 in FIG. 4 when the administrator selects a value in difference 506 column in FIG. 5A.

In this illustrative example, number of changes table 540 comprises various columns, including property name 542, old value 544, and new value 546. Property name 524 specifies the name of the property in the resource which was changed in the configuration. Old value 544 specifies the value of the property prior to the change, and new value 546 specifies the value of the property after the change was made.

FIG. 5D is an exemplary report table in accordance with the illustrative embodiments of the present invention. Report table 550 may be created by playing back the transactions affected by a configuration change over a certain time period. For example, this playback may be initiated by selecting 'schedule report' button 518 in FIG. 5A. Each row in report table 550 displays a report that is associated with one transaction for a single configuration change over an entire report time period.

Report table 550 is also shown to comprise various columns, including date of configuration change 552, overall status 554, administrator responsible for change 556, and affected transactions 558. Date of configuration change 552 may specify the dates (and times of day) on which a configuration change was made. Overall status 554 specifies the outcome that the configuration change has on the affected transactions. Administrator responsible for change 556 column lists the system administrator who made the configuration change. Affected transactions 558 specify the number of transactions that are impacted by the configuration change.

FIG. 5E is an exemplary table illustrating details of the transactions impacted by the configuration changes in accordance with the illustrative embodiments. Table 570 in FIG. 5E may be presented to an administrator via administration console 428 in FIG. 4 when the administrator selects a value in affected transactions 558 column in FIG. 5D.

Figure 6B:
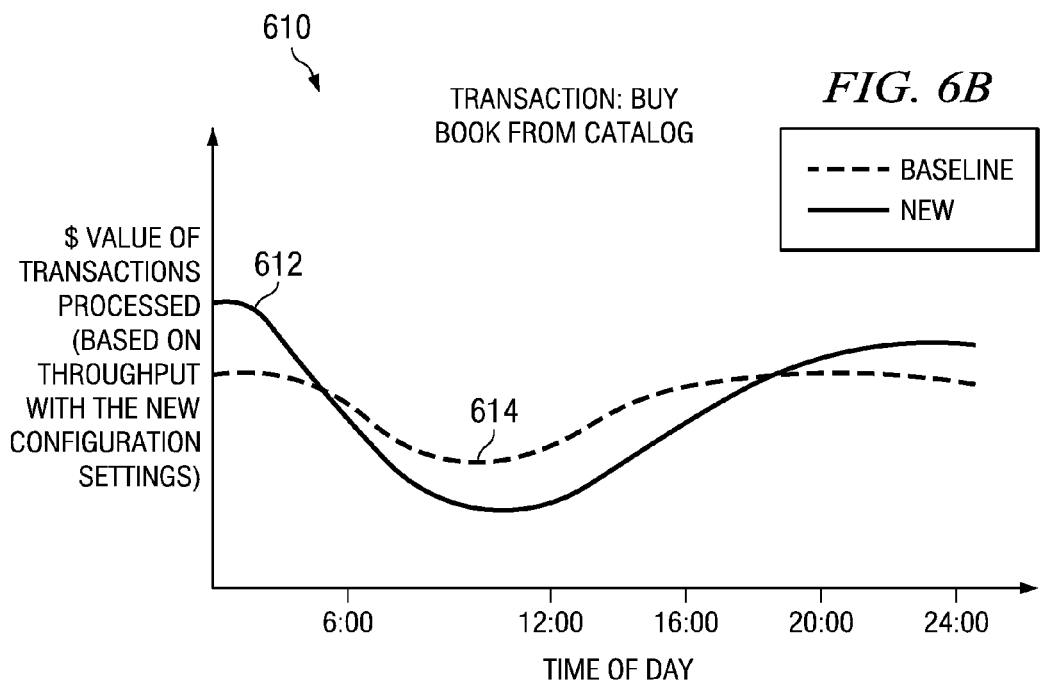
FIG. 6B illustrates the impact a configuration change has on the transaction throughput, and thus profit values, of transactions over a certain period of time in accordance with the illustrative embodiments.

In this illustrative example, table 570 comprises various columns, including transaction name 572, actual profit 574, and detailed report 576. Transaction name 572 provides the names of the transactions which will be impacted by the configuration change. Detailed report 576 specifies the outcome that the configuration change has on a particular transaction. By selecting a value in detailed report 576 column, the transaction details and the impact the change has on the transaction is displayed to the administrator in a transaction time comparison graph report, such as shown in FIG. 6A. The actual profit, which is the amount of additional money the business will make or lose per day based on the configuration change, is reported in actual profit 574. For example, actual profit 574 column for "Buy Book" transaction shows a value of minus $200,000 per day, which means that this much profit was lost due to the configuration change. In contrast, actual profit 574 column for the "Login" transaction has a value of $50,000, which means that the profit per day increased by this amount due to the configuration change. Selecting a value in actual profit 574 column will display the impact to the profit values that the configuration change will have on the transaction in a throughput graph report, such as shown below in FIG. 6B.

Figure 6C:
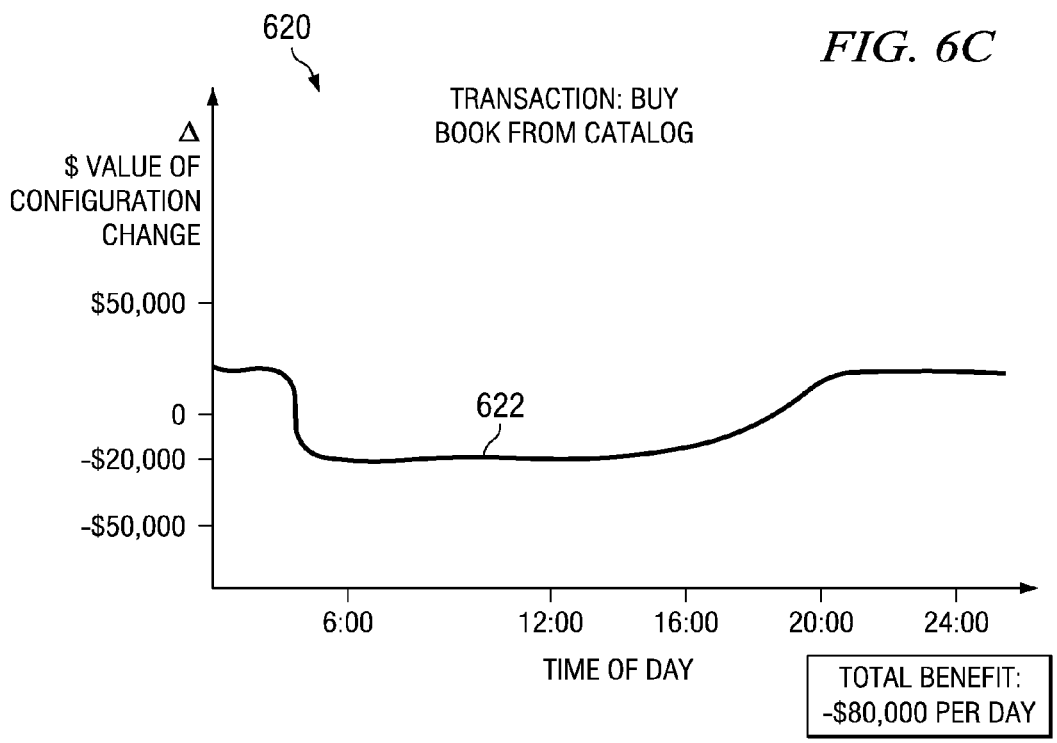
FIG. 6C illustrates the change in total profit values due to a configuration change over a certain period of time in accordance with the illustrative embodiments.

FIGS. 6A-6C are exemplary graphs illustrating details of a particular transaction report in accordance with the illustrative embodiments. Transaction time comparison graph report 600 in FIG. 6A may be presented to an administrator via administration console 428 in FIG. 4 to illustrate the impact a configuration change has on the performance of transactions over a certain period of time. Transaction time comparison graph report 600 may be launched from a report window in administration console 428 which contains a list of current scheduled reports.

In FIG. 6A, transaction time comparison graph report 600 illustrates the impact the configuration change will have on the performance of a transaction, such as transaction 'Buy Book from Catalog'. In this illustrative example, the x-axis is the time of day, and the y-axis is the transaction time (in seconds). New transaction 602 line represents a playback of a synthetic transaction which was recorded after the configuration changes were made, or a changed configuration benchmark. Baseline transaction 604 line represents a playback of a synthetic transaction recorded prior to the configuration changes were made, or a prior configuration benchmark. Transaction time comparison graph report 600 shows a comparison of new transaction 602 and baseline transaction 604 which takes into account the time of day, thereby allowing an administrator to identify the transactions that are faster or slower in the changed configuration benchmark as compared to the prior configuration benchmark due to the changes at any point in time. For instance, as shown, new transaction 602 has a higher transaction time than baseline transaction 604 during particular times of the day (e.g., between 0 and 16:00 hours). The administrator may then decide whether to reverse the change in their transaction server configuration based upon the performance information in the report.

In FIG. 6B, throughput graph report 610 may be presented to an administrator via administration console 428 in FIG. 4 to illustrate the impact a configuration change has on the transaction throughput, and thus profit values, of transactions over a certain period of time. Throughput graph report 610 may be launched from a report window in administration console 428 which contains a list of current scheduled reports.

Throughput graph report 610 illustrates the impact the configuration change will have on the profit values of the transactions. In this illustrative example, the x-axis is the time of day, and the y-axis is the actual profit of the processed transactions. The y-axis is calculated by multiplying the new and old throughput (i.e., how many transactions are processed per minute) of the transaction versus the average profit value of each transaction that the administrator has entered. New transaction 612 line represents a playback of a synthetic transaction which was recorded after the configuration changes were made. Baseline transaction 614 line represents a playback of a synthetic transaction recorded prior to the configuration changes were made. Throughput graph report 610 shows a comparison of profit values of new transaction 612 and the profit values of baseline transaction 614 at different times of the day. As shown, the profit made by the business after the configuration change is greater at the start and close of the business day due to increased throughput, but the transaction throughput slows down during the middle part of the day. Thus, overall, the business receives less money by making the configuration change.

In FIG. 6C, business profit graph report 620 may be presented to an administrator via administration console 428 in FIG. 4 to illustrate the change in total profit values due to a configuration change over a certain period of time. Business profit graph report 620 may be launched from a report window in administration console 428 which contains a list of current scheduled reports.

Business profit graph report 620 illustrates the business impact the configuration change. In this illustrative example, the x-axis is the time of day, and the y-axis is the delta profit value of the configuration change for the business. Thus, line 622 represents the overall profit value of the new transactions and the baseline transactions affected by the configuration change over the report period of time. The delta profit value may be calculated by subtracting the profit values of the baseline transactions from the profit values of the new transactions. In this illustrative example, the total profit to the business of implementing the proposed configuration change is calculated to be −$80,000 per day.

FIG. 7 is a flowchart of a process for automatically determining in real-time the impact of a transaction server configuration change on transaction performance and availability in accordance with the illustrative embodiments. The process described in FIG. 7 may be implemented in a performance monitoring system, such as the monitoring system illustrated in FIG. 4.

The process begins with initiating a set of instrumented synthetic transactions in a distributed computer system (step 702). The synthetic transaction may be obtained by dynamically inserting JITI probes at various entry points in the distributed computer system in order to discover, monitor, and record customer transactions. Each synthetic transaction is then monitored during playback to track the transactions' accesses to managed resources (step 704). The monitoring system tracks the resources the transactions access by using JITI probes to identify the resource lookups in the transactions in order to link each transaction to the resources it uses to perform its functions. Once the lookups for the transactions are known, a monitoring agent uploads this list of managed resources to the monitoring server, where it is stored in a database (step 706). The list of managed resources may then be categorized by the monitoring server (step 708), such as by periodically running a separate thread in the monitoring server at a configurable interval to categorize the information along transactional boundaries.

A notification listener detects configuration changes that have been made to a managed resource (step 710). The notification listener parses the notification to determine what particular resource configuration or application has changed (step 712). Based on changes, the monitoring server automatically uses the categorized resource information to run the specific synthetic transactions associated with the changed resources to verify that the changes have not caused performance or availability problems (step 714). The monitoring server may perform this verification by comparing the new synthetic transaction to a baseline transaction to identify performance issues.

One or more reports comprising the transaction performance and availability measurements for the resource changes is then provided to the administrator (step 716). These reports may be presented to the administrator via an administrative console in the transaction server. Based on the transaction performance information in the reports, the administrator may determine whether to persist the configuration changes to the configuration repository, or to manually rollback the configuration changes (step 718).

Figure 8:
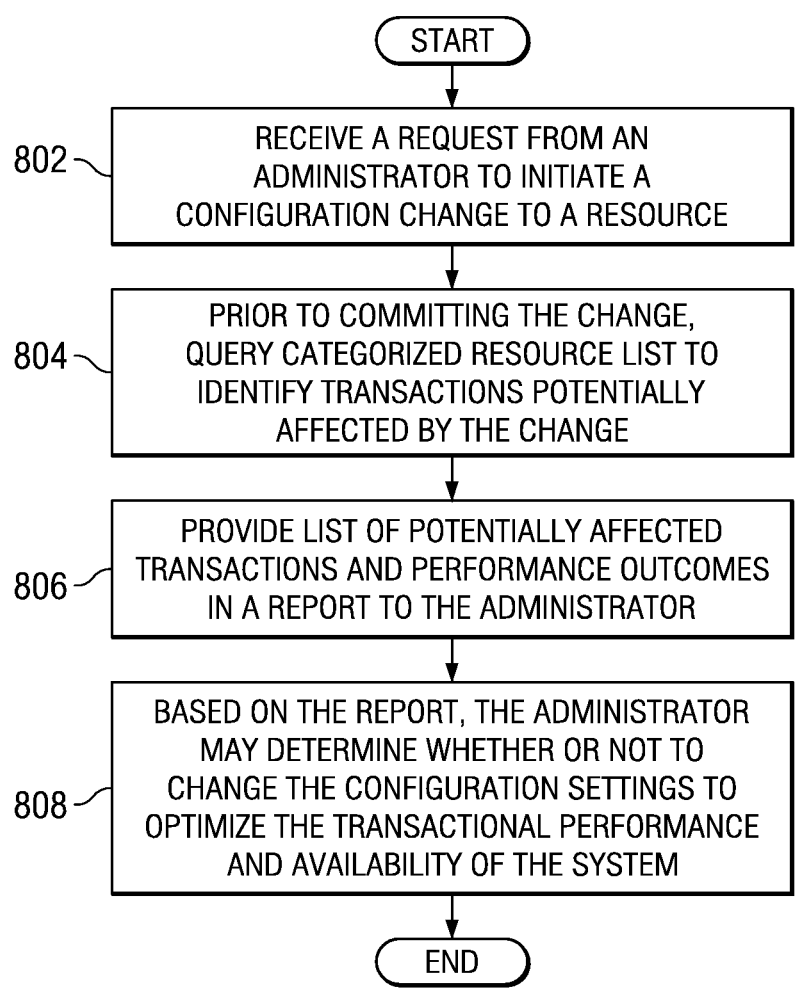
FIG. 8 is a flowchart of a process for determining the potential impact of making configuration changes to a customer's infrastructure in accordance with the illustrative embodiments.

FIG. 8 is a flowchart of a process for determining the potential impact of making configuration changes to a customer's infrastructure in accordance with the illustrative embodiments. The process described in FIG. 7 may be implemented in a performance monitoring system, such as the monitoring system illustrated in FIG. 4.

The process begins with receiving a request from an administrator to initiate a configuration change to a resource (step 802). When a configuration change is received, but prior to committing the change to the configuration repository, a published Web service, such as WebService 426 in FIG. 4, queries the list of categorized resources obtained in step 708 in FIG. 7 in order to identify the transactions that will be affected by the particular configuration change (step 804). A list of potentially affected transactions and information regarding the impact the resource change will have on the performance of the associated transactions is immediately provided to the administrator in one or more reports (step 806). Based on the transaction performance information in the reports, the administrator may determine whether to change the configuration settings to optimize the transactional performance and availability of the system (step 808).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for determining an effect of a proposed configuration change on a transaction basis to at least one element in a distributed computer system comprising the steps of:
    initiating a set of instrumented synthetic transactions in the distributed computer system;
    tracking access to managed resources by synthetic transactions to produce a list of utilized resources for the transactions;
    categorizing the utilized resources according to criteria including associating the utilized resources with respective transactions;
    repeating the initiating, tracking, and categorizing steps after a proposed configuration change using a selected subset of the set of transactions, wherein respective members of the selected subset of the set of transactions are selected by identifying transactions which access the utilized resources affected by the proposed configuration change;
    benchmarking the distributed computer system having a changed resource using synthetic transactions to produce a changed configuration benchmark compared to a prior configuration benchmark of the distributed computer system measured prior to the configuration change; and
    displaying a comparison of the changed configuration benchmark and the prior configuration benchmark.

2. The computer-implemented method of claim 1, wherein the step of benchmarking the distributed computer system having the changed resource using the synthetic transactions to produce the changed configuration benchmark of the distributed computer system measured prior to the configuration change comprises:
    identifying an amount of time used to perform at least one instrumented synthetic transaction in the instrumented synthetic transactions that accessed the utilized resource.

3. The computer-implemented method of claim 2, wherein the amount of time is a first amount of time, and wherein the step of displaying the comparison of the changed configuration benchmark and the prior configuration benchmark further comprises:
    displaying the first amount of time and a second amount of time used to perform the at least one instrumented synthetic transaction in the prior configuration benchmark.

4. The computer-implemented method of claim 1 further comprising:
    receiving a proposed configuration change for the managed resource;
    identifying at least one synthetic transaction in the instrumented synthetic transactions that is affected by the proposed change to the configuration;
    presenting the at least one synthetic transaction that is affected by the proposed change to the configuration.

5. The computer-implemented method of claim 1, further comprising:
    prior to initiating the instrumented synthetic transactions in the distributed computer system, recording a set of user transactions run on the distributed computer system to form the instrumented synthetic transactions.

6. An apparatus for determining an effect of a proposed configuration change on a transaction basis to at least one element in a distributed computer system, the apparatus comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable program code to initiate a set of instrumented synthetic transactions in the distributed computer system, track access to managed resources by synthetic transactions to produce a list of utilized resources for the transactions, categorize the utilized resources according to criteria including associating the utilized resources with respective transactions, repeat the initiate, track, and categorize steps after a proposed configuration change using a selected subset of the set of transactions, wherein respective members of the selected subset of the set of transactions are selected by identifying transactions which access the utilized resources affected by the proposed configuration change, benchmark the distributed computer system having a changed resource using synthetic transactions to produce a changed configuration benchmark compared to a prior configuration benchmark of the distributed computer system measured prior to the configuration change, and display a comparison of the changed configuration benchmark and the prior configuration benchmark.

7. The apparatus of claim 6, wherein in executing the computer usable program code to benchmark the distributed computer system having the changed resource using the synthetic transactions to produce the changed configuration benchmark of the distributed computer system measured prior to the configuration change, the processing unit executes the computer usable program code to identify an amount of time used to perform at least one instrumented synthetic transaction in the instrumented synthetic transactions that accessed the utilized resource.

8. The apparatus of claim 7, wherein the amount of time is a first amount of time, and wherein in executing the computer usable program code to display the comparison of the changed configuration benchmark and the prior configuration benchmark, the processing unit executes the computer usable program code to display the first amount of time and a second amount of time used to perform the at least one instrumented synthetic transaction in the prior configuration benchmark.

9. The apparatus of claim 6, wherein the processing unit further executes the computer usable program code to receive a proposed configuration change for the managed resource, identify at least one synthetic transaction in the instrumented synthetic transactions that is affected by the proposed change to the configuration, and present the at least one synthetic transaction that is affected by the proposed change to the configuration.

10. The apparatus of claim 6, wherein the processing unit further executes the computer usable program code to record a set of user transactions run on the distributed computer system to form the set of instrumented synthetic transactions prior to initiating the set of instrumented synthetic transactions in the distributed computer system.

11. A computer program product for determining an effect of a proposed configuration change on a transaction basis to at least one element in a distributed computer system, the computer program product comprising:

a storage-type computer usable medium having computer usable program code tangibly embodied thereon, the computer usable program code comprising:

computer usable program code for initiating a set of instrumented synthetic transactions in the distributed computer system;

computer usable program code for tracking access to managed resources by synthetic transactions to produce a list of utilized resources for the transactions;

computer usable program code for categorizing the utilized resources according to criteria including associating the utilized resources with respective transactions;

computer usable program code for repeating the initiating, tracking, and categorizing steps after a proposed configuration change using a selected subset of the set of transactions, wherein respective members of the selected subset of the set of transactions are selected by identifying transactions which access the utilized resources affected by the proposed configuration change;

computer usable program code for benchmarking the distributed computer system having a changed resource using synthetic transactions to produce a changed configuration benchmark compared to a prior configuration benchmark of the distributed computer system measured prior to the configuration change; and computer usable program code for displaying a comparison of the changed configuration benchmark and the prior configuration benchmark.

12. The computer program product of claim 11, wherein the computer usable program code for benchmarking the distributed computer system having the changed resource using the synthetic transactions to produce the changed configuration benchmark of the distributed computer system measured prior to the configuration change comprises:

computer usable program code for identifying an amount of time used to perform at least one instrumented synthetic transaction in the instrumented synthetic transactions that accessed the utilized resource.

13. The computer program product of claim 12, wherein the amount of time is a first amount of time, and wherein the computer usable program code for displaying the comparison of the changed configuration benchmark and the prior configuration benchmark further comprises:

computer usable program code for displaying the first amount of time and a second amount of time used to perform the at least one instrumented synthetic transaction in the prior configuration benchmark.

14. The computer program product of claim 11 further comprising:

computer usable program code for receiving a proposed configuration change for the managed resource;

computer usable program code for identifying at least one synthetic transaction in the instrumented synthetic transactions that is affected by the proposed change to the configuration;

computer usable program code for presenting the at least one synthetic transaction that is affected by the proposed change to the configuration.

* * * * *